(12) United States Patent
Allen

(10) Patent No.: US 10,419,483 B1
(45) Date of Patent: Sep. 17, 2019

(54) TIME-BOUNDED EXECUTION FOR PRIVILEGED CODE

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 14/489,267

(22) Filed: Sep. 17, 2014

(51) Int. Cl.
*G06F 17/00* (2019.01)
*H04L 29/06* (2006.01)

(52) U.S. Cl.
CPC .................................. *H04L 63/20* (2013.01)

(58) Field of Classification Search
CPC ............. G06F 11/3612; G06F 11/3636; G06F 17/2247; G06F 2207/222; G06F 11/3608; G06F 11/3457; G06F 17/5009; G06F 8/4441; G06F 8/443; G06F 21/50; G06F 21/51; G06F 21/53; G06F 21/52; G06F 21/54; H04L 63/20; H04L 63/1433
See application file for complete search history.

(56) References Cited

U.S. PATENT DOCUMENTS

| | | | | |
|---|---|---|---|---|
| 5,940,622 A | * | 8/1999 | Patel ........................ | G06F 8/443 717/158 |
| 2007/0107057 A1 | * | 5/2007 | Chander ................. | G06F 21/54 726/22 |
| 2007/0180439 A1 | * | 8/2007 | Sundararajan ...... | G06F 11/3644 717/158 |
| 2008/0167854 A1 | * | 7/2008 | Gupta ................. | G06F 17/5022 703/28 |
| 2012/0167211 A1 | * | 6/2012 | Mao ...................... | G06F 21/554 726/22 |
| 2014/0258996 A1 | * | 9/2014 | Brackman ............... | G06F 8/443 717/151 |
| 2014/0298300 A1 | * | 10/2014 | Rhee .................... | G06F 11/3466 717/127 |
| 2015/0326586 A1 | * | 11/2015 | Khesin ................. | G06F 21/568 726/1 |

OTHER PUBLICATIONS

Engblom et. al., Worst-case execution-time analysis for embedded real-time systems, Nov. 19, 2002, Springer-Verlag, pp. 437-455.*
Bernat et al., Portable Worst-Case Execution Time Analysis Using Java Byte Code, 2000.*

* cited by examiner

*Primary Examiner* — Trong H Nguyen
(74) *Attorney, Agent, or Firm* — Davis Wright Tremaine LLP

(57) ABSTRACT

A system and method for generating remediated instructions that complies with one or more policies that specify constraints for computer executable instructions. The remediated instructions are generated based at least in part on an evaluation of a set of straight-line paths of the set of executable instructions and an execution flow for the set of straight-line paths.

20 Claims, 10 Drawing Sheets

US 10,419,483 B1

TIME-BOUNDED EXECUTION FOR PRIVILEGED CODE

BACKGROUND

In modern computer systems, privileged code is software that executes with high priority. While running, privileged code may suspend or preempt normal operation of a computer. However, privileged code, if not written with extreme care, may unduly impair the computer system by preventing servicing of deadline-sensitive operations, such as interrupt servicing or meeting a service-level agreement, if the privileged code runs longer than intended or becomes trapped in an infinite loop. Unfortunately, mitigating the risk of runaway execution in privileged code through manual design reviews increases software development costs, and implementing watchdog systems can impair the performance of operating the computer system.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include a low-cost mechanism for mitigating the risk of runaway execution of code, which may be code configured to run in a privileged context. The mitigation mechanism includes a code analyzer that receives a block of computer-executable instructions meant to execute in a privileged context and a policy that defines an execution policy for the block of computer-executable instructions. The code analyzer disassembles the block of computer-executable instructions into a series of straight-line paths.

A policy analyzer may then determine an upper bound of execution time for each straight-line path, and determine a collection of execution flows that combine one or more of the straight-line paths. Straight-line paths for which the policy analyzer is unable to determine an upper bound of execution time may be assigned an estimated or maximum upper bound for the straight-line path. For each execution flow, the code simulator may determine whether the upper bound of execution time conforms to the policy. If an execution flow is identified as violating the execution policy, the code simulator may insert code that causes the execution flow to run constrained by a bounded execution period in accordance with the execution policy into the block of computer-executable instructions. In this manner, runaway execution may be prevented from occurring in the privileged context.

The inserted code may bound the execution period in various ways, including limiting one or more iterations for a loop or limiting a nesting depth for a sequence of recursive function calls. For example, a program might be written to process all items in a collection in a loop and a policy analyzer may determine that the execution policy will be violated if the number of items in the collection is greater than N, where N is a positive integer. The analyzer code processor may insert instructions into the program to cause the loop to abort when either all items in the collection have been processed or the number of items processed is equal to N. In one embodiment, the programmer may annotate a portion of the computer executable instructions as critical for the function. In such an embodiment, the code processor may then refrain from inserting instructions in the critical portion.

Figure 1:
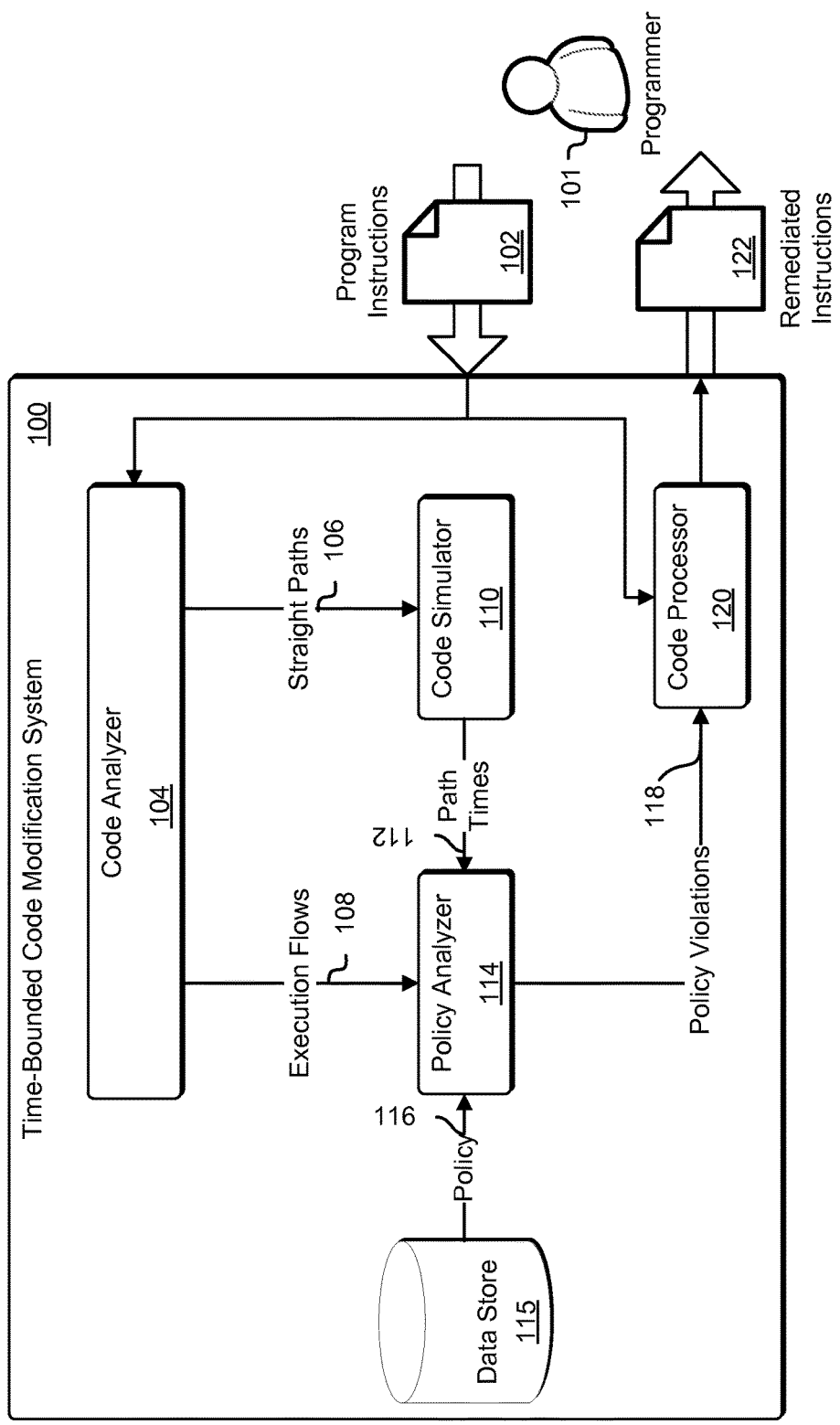
FIG. 1 illustrates an example of a time-bounded execution system in accordance with an embodiment.

FIG. 1 illustrates an example of a time-bounded code modification system 100 of an embodiment of the present disclosure. As illustrated in FIG. 1, the time-bounded code modification system 100 may include receiving program instructions 102 from a programmer 101 for analysis by a code analyzer 104 to determine a series of straight-line paths 106 from which execution flows 108 are derived. The straight-line paths 106 are evaluated by a code simulator 110 to determine path times 112 for each of the straight-line paths 106, whereupon the path times 112 and the execution flows 108 are reviewed by a policy analyzer 114 for compliance with a policy 116 for any policy violations 118. The policy violations 118 found may cause a code processor 120 to inject bounding code into the program instructions 102 to yield remediated instructions 122.

The program instructions 102 in the embodiment of FIG. 1 may be a program (which may be a relatively small program) written to execute in a privileged or trusted context. As used, "privileged context" refers to an operational state of the program whereby it runs at the highest level of priority in a software execution environment. An example of a software execution environment is an operating system, and examples of code that typically runs in a privileged context in the operating system include input/output operations and system services. Thus, in some cases, the program instructions may be written to run with direct access to hardware of the computer system, such as program instructions configured to run as a hypervisor plug-in within a hypervisor. In such a case, the present disclosure provides an advantage of mitigating the risk that programs with direct access to hardware could unnecessarily impede performance of the computer system or cause the computer system to become unstable. The program instructions may be written by a customer of a computing resource service provider to run on one or more computer systems in a distributed computing system used by the customer, or any other programmer, and processed through the time-bounded code modification system 100 to verify that the program instructions comply with the policy 116.

The program instructions 102 may be initially passed through the code analyzer 104. The code analyzer 104 may be implemented as one or more applications or application modules running on one or more servers. In some cases the code analyzer 104 may run on the same computer system on which the program instructions 102 may configured to run, but in other cases, the code analyzer 104 may be running on a different computer system than the one on which the program instructions 102 may be configured to run. Alternatively, the code analyzer 104 may be implemented in hardware, such as in one or more application-specific integrated circuits. Furthermore, although the code analyzer 104, the code simulator 110, the policy analyzer 114, and the code processor 120 are illustrated as separate modules, the functions of one or more of these modules may be combined with or distributed among the other modules. Likewise, it is contemplated that the functions of one or more of these modules could be separated into one or more sub-modules. It must also be noted that the time-bounded code modification system 100 may be implemented in a distributing computing system and, as such, one or more of the modules, including the data store 115 may reside and/or execute on a different computer system than the others.

The code analyzer 104 may parse the program instructions 102 into a series of straight-line paths 106. A straight-line path is a series of instructions that do not have any branches within them. Thus, the code analyzer 104 searches through the program instructions 102 to locate all of the branching points in the program instructions 102 and identify all of the straight-line paths 106 in-between those branching points. Thus, the straight-line paths 106 comprise the non-branching segments of the program instructions 102. Given an example of a program that has a loop and a function that is called within the loop, program instructions from the start of the program to the start of a loop may comprise a first straight-line path. Program instructions from the start of the loop to the function call may comprise a second straight-line path. Program instructions within the called function may comprise a third straight-line path. Program instructions from the function call to the end of the loop may comprise a fourth straight-line path, and, finally, program instructions from the end of the loop to the end of the program may comprise a fifth straight-line path. Note that, in some cases, the code analyzer 104 may initially compile the program instructions 102 from a higher-level language to low-level program instructions, before breaking the program instructions 102 into the straight-line paths 106. An example of low-level program instructions is Assembly language. Examples of higher-level languages include C, C++, C#, Visual Basic, Perl, Java, and Python.

Once the straight-line paths 106 have been determined, each of the straight-line paths 106 may be passed through the code simulator 110. The code simulator 110 may determine the path times 112 of the straight-line paths 106 by analyzing each straight-line path to determine a timing value for each path. The timing may vary, depending on various factors, such as the particular instructions in the straight-line path (e.g., different instructions may require differing numbers of instruction cycles to complete), other programs that may be running, and whether memory accesses may check cache and receive a cache miss.

The code simulator 110 may be implemented as one or more applications or application modules running on one or more servers. In some cases the code simulator 110 may run on the same computer system on which the program instructions 102 may configured to run, but in other cases, the code simulator 110 may be running on a different computer system than the one on which the program instructions 102 may be configured to run. Alternatively, the code simulator 110 may be implemented in hardware, such as in one or more application-specific integrated circuits. Furthermore, although the code analyzer 104, the code simulator 110, the policy analyzer 114, and the code processor 120 are illustrated as separate modules, the functions of one or more of these modules may be combined with or distributed among the other modules. Likewise, it is contemplated that the functions of one or more of these modules could be separated into one or more sub-modules. It must also be noted that the time-bounded code modification system 100 may be implemented in a distributing computing system and, as such, one or more of the modules, including the data store 115 may reside and/or execute on a different computer system than the others.

In some embodiments, the code simulator 110 may be a form of a processor simulator; that is, rather than simulating what a processor of the computer system may be doing internally and outputting a result, the code simulator 110 may additionally or alternatively examine each of the straight-line paths 106 to determine the instruction counts for each of the instructions in the straight-line paths 106. In other embodiments, the code simulator 110 may simulate the execution of each instruction to produce a benchmark score as the path time. In some cases, the code simulator 110 may also simulate memory in order to determine a time estimate for instructions that retrieve one or more values from memory. In this way, the code simulator 110 may include in the path time an estimate of how many clock cycles it may take to perform the memory access. Thus, the code simulator 110 may simulate the major components of the system that influence the cycle count for each of the straight-line paths.

The path time of a straight-line path therefore reflects an estimate of how long the particular straight-line path may take to execute. The path time may include an estimated time and a confidence score; the confidence score may be a percentage indicating that for that percentage of cases, the particular straight-line path may take that estimated time or less to execute (e.g., a path time of 99%/1500 may indicate that, 99% of the time, the straight-line path may execute in 1,500 instruction cycles or less).

In addition, the code analyzer 104 may generate the execution flows 108 based on the program instructions 102 and the straight-line paths 106. The execution flows 108 may comprise a data structure that maps how each of the straight-line paths 106 is connected; that is, the execution flows 108 comprise information sufficient to reconstruct the original program instructions 102 from the straight-line paths 106. Once the straight-line paths have been determined, the policy analyzer 114 may examine the execution flows 108 to locate the branching paths in the program and to determine how the straight-line paths 106 should be combined into the branches.

The policy analyzer 114 may be implemented as one or more applications or application modules running on one or more servers. In some cases the policy analyzer 114 may run on the same computer system on which the program instructions 102 may be configured to run, but in other cases, the policy analyzer 114 may be running on a different computer system than the one on which the program instructions 102 may be configured to run. Alternatively, the policy analyzer 114 may be implemented in hardware, such as in one or more application-specific integrated circuits. Furthermore, although the code analyzer 104, the code simulator 110, the policy analyzer 114, and the code processor 120 are illustrated as separate modules, the functions of one or more of these modules may be combined with or distributed among the other modules. Likewise, it is contemplated that the functions of one or more of these modules could be separated into one or more sub-modules. It must also be noted that the time-bounded code modification system 100 may be implemented in a distributing computing system and, as such, one or more of the modules, including the data store 115 may reside and/or execute on a different computer system than the others. Utilizing this information, the policy analyzer 114 may determine a time (i.e., cost) estimate for the program instructions 102 by traversing the execution flows 108, following the branches, and evaluating the path times (and, in some cases, the probability estimates) of the straight-line paths 106.

The policy analyzer 114 may compare the time estimate for the program instructions 102 against the policy 116. The policy 116 may be a set of data stored in a data store 115 that indicates one or more service-level agreements for the execution of the program instructions. In some embodiments, the policy 116 may indicate a maximum or minimum amount of time that the program is allowed to run. The data store 115 may reside on a computer system upon which one or more of the code analyzer 104, the code simulator 110, the policy analyzer 114, the code processor 120, or the computer system targeted for execution of the program instructions 102 or may reside on one or more separate computer systems, such as may be in a distributed computing system of a data storage service of a computing resource service provider. In other embodiments, the policy 116 may comprise bounds that influence the time estimates of the policy analyzer 114. In some of these embodiments, the code simulator 110 may produce multiple estimates and the policy analyzer 114 may include a minimum confidence score for determining an appropriate estimate. For example, the code simulator 110 may produce a result that indicates that 50% of the time execution of the straight-line path may complete in less than 500 instruction cycles, 95% of the time execution of the straight-line path may complete in less than 700 instruction cycles, and 99% of the time the straight-line path may complete in less than 11,000 instruction cycles. For this example, the policy analyzer 114 may combine the estimates to get an overall probability for the straight-line path. These probabilities may be used by the policy analyzer 114 to assemble the execution flows 108 together to determine an overall estimated execution time and probability and/or whether any policy violations 118 were found with the program instructions 102 or straight-line paths 106.

The policy 116 may specify a time for the overall program, for the execution of particular straight-line paths 106, or for execution of particular branches of the program. If any of the time estimates determined by the policy analyzer 114 exceed the relevant times specified in the policy 116, the program, straight-line path, or branch may be flagged with a policy violation 118. Furthermore, if, while the policy analyzer 114 was traversing the execution flows 108, the policy analyzer 114 was unable to estimate an execution time for a branch, the branch may also be flagged with a policy violation. For example, if the branch is a loop and the policy analyzer is unable to determine how many iterations the loop will make before stopping, the time estimate for the loop may be tagged with a sentinel value, such as a null value, large value, best estimate, or "infinite" value, which may violate the policy 116. Note that the policy 116 may also define other conditions that may cause portions of the program instructions 102 to be flagged with policy violations 118 as well, such as unsafe threading, memory leaks, and improper garbage collection.

The policy violations 118, if any, may then be passed to the code processor 120. The code processor 120 may be implemented as one or more applications or application modules running on one or more servers. In some cases the code processor 120 may run on the same computer system on which the program instructions 102 may be configured to run, but in other cases, the code processor 120 may be running on a different computer system than the one on which the program instructions 102 may be configured to run. Alternatively, the code processor 120 may be implemented in hardware, such as in one or more application-specific integrated circuits. Furthermore, although the code analyzer 104, the code simulator 110, the policy analyzer 114, and the code processor 120 are illustrated as separate modules, the functions of one or more of these modules may be combined with or distributed among the other modules. Likewise, it is contemplated that the functions of one or more of these modules could be separated into one or more sub-modules. It must also be noted that the time-bounded code modification system 100 may be implemented in a distributing computing system and, as such, one or more of the modules, including the data store 115 may reside and/or execute on a different computer system than the others. The code processor 120 may analyze the program instructions 102 having policy violations 118 and determine how the program instructions 102 may be modified to avoid violating the policy 116. For example, if the time estimate for a particular loop was tagged with a sentinel value that causes a policy violation the code processor 120 may modify the loop to have a hard constraint (e.g., terminate after the original condition is satisfied or a certain number of iterations have passed, whichever comes first) to produce the remediated instructions 122. The code processor 120 may determine the bounds of such a hard constraint based on the policy 116. For example, if the policy 116 specifies that the program instructions 102 must execute in less than 15,000 instruction cycles and the policy analyzer was able to determine that the non-violating execution flows will consume 10,000 instruction cycles, the code processor 120 may determine hard constraints based on the remaining 5,000 instruction cycles and the particular path times of the straight-line paths 106 of the execution flows 108 having the policy violations 118.

Using the example above, if the policy analyzer 114 identifies two loops, one having a straight-line path of 400 instruction cycles and the other having a straight-line path of 300 instruction cycles, that are flagged with policy violations 118, using one scheme, the code processor may divide the instruction cycles equally between the two loops, resulting in a hard constraint of five iterations for the first loop ((5,000÷2)÷500=5) and 12 iterations for the second loop (((5,000÷2)÷200=12.5). Alternately, in another scheme, the hard constraint may be allocated in inverse proportion to the instruction cycles of their straight-line paths; e.g., the first loop may be allocated a hard constraint of two iterations ((5,000÷500)×(((500+200)−500)÷(500+200))=2.86) and the second loop may be allocated a hard constraint of 17 iterations ((5,000÷200)×(((500+200)−200)÷(500+200))=17.86); in this way, the first loop is limited to consuming no more than 1,000 instruction cycles (500×2=1,000) and the second loop is limited to consuming 3,400 (200×17=3, 400) instruction cycles for a total of 4,400 instruction cycles, thereby being within the remaining 5,000 instruction cycles of the policy 116.

Note that other types of allocation scheme for determining the hard constraints, including rule-based schemes and schemes having complex conditions based on the types of instructions in the straight-line paths 106 are contemplated as being within the scope of the current disclosure. Note also that the present disclosure contemplates that some of the components 102-22 of the time-bounded code modification system 100 may be combined or may be separated into other discrete components. Furthermore, the components 102-22 of the time-bounded code modification system 100 may be performed in various orders and combinations, including in parallel, other than that depicted by FIG. 1.

After the program instructions 102 have been modified by the code processor 120, the modified code may be presented to the programmer. The modifications may serve to notify the programmer about the portions of the program instructions 102 that the policy analyzer 114 has identified as being policy violations 118. The programmer may then be presented with an option to allow the program instructions 102 to execute with the remediated instructions 122. Alternatively, the programmer, now having notice of the policy violations 118 of the program instructions 102, may attempt to edit and resubmit the program instructions 102 in an attempt to bring the program instructions into compliance with the policy 116. For example, the remediated instructions 122 may have had a ten-count counter inserted as an additional loop condition of the program instructions 102, and the programmer may decide that rather than have such a counter inserted as a loop condition, another modification may be made to the program instructions 102 that might both be more acceptable to the programmer and also be in compliance with the policy 116.

Figure 2:
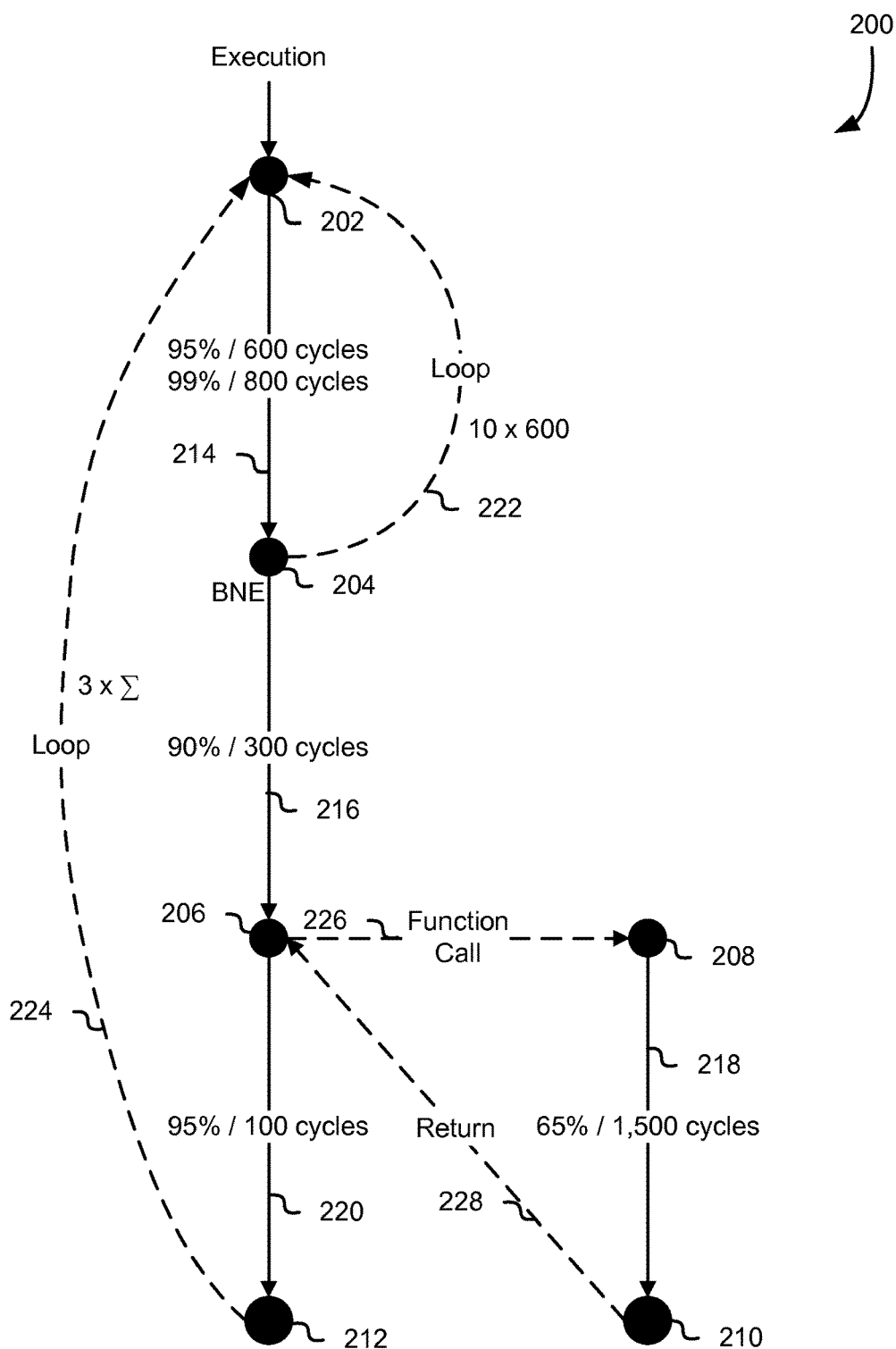
FIG. 2 illustrates an example of an execution flow of a program in accordance with an embodiment.

FIG. 2 illustrates a portion of an example program 200 as it may be analyzed in accordance with an embodiment modeled as a graph. FIG. 2 depicts a series of vertices 202-12 (nodes) that represent branches in the portion of the program 200. The paths 214-20 (paths) represent the straight-line paths (i.e., non-branching code portions/segments), as described in conjunction with straight-line paths 106 of FIG. 1, of the portion of the program 200. For example, the node 202 may represent the starting point of the program when it is executed. The code represented by path 214 may be executed until the node 204 is reached. The node 204 may be a branch not-equal loop (BNE) that makes an inner loop 222 back to node 202 to repeat the code of path 214 for one or more iterations. When the inner loop 222 terminates, the code represented by the path 216 may execute until the node 206 is reached. The node 206 may be a function call 226 that branches to node 208, executes the program code represented by path 218, and makes a return 228 to node 206. The program code may continue to execute the code represented by path 220, whereupon, after reaching the node 212, the code may again make an outer loop 224 back to the node 202. This process may continue for one or more iterations until terminating at node 212. Note, that the graph of FIG. 2 is for illustration purposes only, and programs of both more and less complex nature than that depicted by FIG. 2 are contemplated as being within the scope of the present disclosure.

The instructions of the nodes 202-12 may be regarded as a single instruction, such as a branch not-equal instruction that causes the execution of the program to jump to another point in the program or a return instruction that causes the execution of the program to return to a previously departed point in the program. On the other hand, the paths 212-20 may represent any number of non-branching instructions. The path analyzer may analyze each of these straight-line paths to estimate a measurement of how long each of the straight-line paths may take to complete execution. The unit of measure may be any measurement for determining a length of time for a portion of code to execute, such as an instruction cycle. For the portion of the example program 200, it may be that the path analyzer estimates the length of the code portion represented by path 214 to be 600 instruction cycles. Similarly, the path analyzer may estimate length of the code portion of path 216 to be 300 instruction cycles, the length of the code portion of path 218 to be 1,500 instruction cycles, and the length of the code portion of path 220 to be 100 instruction cycles.

In some cases, the estimated lengths may also be given an associated confidence score. For example, the code represented by path 214 may be have an estimated length of 600 instruction cycles with a confidence score of 95%; that is, 95% of the time, the code represented by path 214 should take about 600 instruction cycles or less to complete. This suggests that, for 5% of the time, the code represented by path 214 may take longer than 600 instruction cycles. Therefore, in some other cases, there may be multiple confidence scores describing the path 214. For example, the path analyzer may determine that 95% of the time, the code represented by path 214 should take about 600 instruction cycles to complete, but that 99% of the time, the code represented by path 214 will complete in under 800 instruction cycles.

The confidence scores may be used for various purposes, such as determining the likelihood of a violation. For example, if it is determined that policy violation is more than 50% likely to occur (e.g., a confidence score with possible values between zero and one is greater than 0.5), the straight-line path and/or the program instructions as a whole may be treated as if there was a policy violation. Additionally or alternatively, the confidence scores may be used to determine whether to utilize an additional mechanism, such as a watchdog timer, in the remediated instructions. In that way, if a confidence score is less than 100% or some other threshold, the watchdog timer may trigger the program to terminate a loop or terminate execution if an execution time, number of instruction cycles, or other measurable condition exceeds a threshold.

The execution flow, as described concerning the execution flows 108 of FIG. 1, becomes the concatenation, in order, of all of the straight-line paths; e.g., effectively the graph of the program 200 of FIG. 2. The policy analyzer, such as the policy analyzer 114 of FIG. 1, may then walk through the execution flow to determine a total runtime. The policy analyzer, starting at node 202 may count 600 instruction cycles of path 214 (discounting the confidence scores and the nominal instruction cycle contribution of each node for simplification purposes), whereupon it may return to node 202 and count another 600 instruction cycles for some number of iterations of the inner loop 222. Loops may be of a form where a counter is set to an initial value and then incremented or decremented until they reach a certain value. For example, a counter may be set to a value of ten, and, on each iteration of the inner loop 222, the counter may be decremented by one, until the counter reaches a loop termination condition, such as when the counter equals zero, at which point the inner loop 222 may terminate. Such loop termination conditions may be detectable by the policy analyzer, and, consequently, the policy analyzer may be able to determine exactly how many iterations the inner loop 222 may run. On the other hand, if the inner loop 222 repeats until a more complex condition is satisfied, such as until a key press is received from a user, the policy analyzer may be unable to determine when the inner loop 222 will end.

If the policy analyzer is unable to estimate a total number of iterations of the inner loop 222, the policy analyzer may tag the inner loop 222 with a sentinel value. Because unbounded loops may not be permitted to execute in a privileged context, the sentinel value may cause a loop to be considered to violate the policy. In a case where the policy analyzer is able to identify a loop termination condition and estimate the number of iterations for the inner loop 222, ten iterations of a straight line path having 600 instruction cycles for example, yields a total of 6,000 instruction cycles (10×600=6,000) for execution. The policy analyzer, in an embodiment, then counts the number of instruction cycles of the code represented by path 216, for a total of 6,300 instruction cycles (6,000+300=6,300). The policy analyzer may then follow the execution flow of the function call 226 to node 208 to add the instruction cycles of the code portion represented by path 218 to yield 7,800 instruction cycles (6,300+1,500=7,800). Upon the return 228 to node 206, the policy analyzer may add the 100 instruction cycles of the code portion represented by the path 220 to yield 7,900 instruction cycles (7,800+100=7,900).

From node 212, the execution flow may jump to node 202 for a number of iterations. As with the inner loop 222, if the number of iterations of outer loop 224 cannot be estimated, it may be set to a sentinel value and thereby violate a policy. On the other hand, assuming the number of iterations of the outer loop 224 can be estimated to be three, the overall number of instruction cycles can be estimated to be three times the number of the cycles counted for the first iteration, or 23,700 instruction cycles (3×7,900=23,700) that the program will potentially take to run.

Essentially, every loop condition may be turned into a variable in a computer algebra system that may be solved in order to determine an upper bound on the number of times through the loop. For example, because the inner loop 222 is a loop within a loop, the second time through the inner loop 222 may be determined to be 20 iterations and the third time through the inner loop 222 may be determined to be 30 iterations, and so on. In this manner, the policy analyzer may be able to determine the number of iterations outside the context of the overall program. If the policy analyzer is unable to put a bound on a loop or function, the policy analyzer may tag the code portion as policy violation.

A code processor, such as the code processor 120 of FIG. 1, may then analyze the actual instructions in such loops that are tagged with such sentinel values that cause policy violations. The code processor may be configured to inject an additional condition into the loop conditions; that is, the original code may be modified to include an additional test. For example, in addition to the original loop condition, a second branch construction with a hard constraint, such as a counter with ten iterations, may be inserted. In this example, the counter may be inserted within the inner loop 222 and initially set to ten and decremented each iteration and a condition to terminate the inner loop 233 upon the counter reaching zero. In this way, the inner loop 222 may repeat until the original condition is fulfilled or until the inner loop 222 completes ten iterations, whichever comes first. In this way, even if the original condition is not satisfied, the inner loop 222 will repeat, at most, ten iterations before terminating.

In this way, the program instructions may be modified in such a way that the maximum runtime may be determined.

Counter values may be determined based on a policy, such as the policy 116, which may represent a service-level agreement for the program instructions. Such a service-level agreement may specify an overall budget for the program instructions. For example, assuming for simplicity that the outer loop 224 only executes once, the program represented by FIG. 2 may be allocated an overall budget of 10,900 instruction cycles. Because the policy analyzer can determine that 1,900 instruction cycles occur between nodes 204-12 (300+1,500+100=1,900), leaving 9,000 instruction cycles available in the budget, the inner loop 222, at most, can repeat 15 times before the budget is exhausted (9,000/600=15). Thus, a counter can be inserted into the program instructions of the inner loop 222 with an initial value of 15, decremented each iteration, and, if the original condition is not satisfied first, the inner loop 222 can be terminated when the counter equals zero. The overall budget may be different for different programs. For example, instead of a budget of 10,900, a program of lesser importance than the one in the example given above may be given an overall budget of 8,000 instruction cycles. The overall budget may be determined by a service-level agreement between a customer and a computing resource service provider.

Note that various methods of determining which portions of the program instructions should be limited by the remaining budget may be used. In a more complex example than that shown in FIG. 2, there may be several inner loops and/or recursive functions tagged with policy violations that must share the remaining budget. In some cases, the remaining budget may be distributed between the loops/functions in proportion to the number of instructions within the straight-line paths of the loops/functions. In other cases, loops/functions with more instructions may be presumed to be more taxing on the computer system and be allocated smaller budgets than loops/functions with fewer instructions. Because the programmer may not be in agreement with the bounds placed on the program by the system of the present disclosure, in some embodiments the programmer may be notified of the proposed modifications to the program instructions and the programmer may be permitted to modify the program instructions to bring the program into compliance with the policy. In such a case, the program again may be checked according to the process described in reference to FIG. 1.

A recursive function, procedure, or subroutine (collectively referred to as recursive functions) is a function that may call itself within its program code, thereby creating nested levels of the function in the call stack for the computer program, and, in a manner similar to placing bounds on the number of iterations of loops, bounds may also be placed on these recursive function calls. For example, if the code in the function represented by the path 218 is a function that, in addition to returning back to 206, can call itself, the code analyzer may evaluate the function to determine how deeply nested the function could go. In such a case, a counter may again be injected into the code to limit the depth of recursion allowed to the function. That is, the system may determine that the function may only be allowed to call itself a fixed number of times and, once that number is reached, the function at the deepest level of recursion may be forced to return to the calling function, whereupon the calling function may be forced to return to the function that called it, etc. E.g., using the example above, once the counter is decremented to zero, the function execution begins traversing back up the nest (e.g., popping back up the call stack) to make the return 228 to node 206.

In many cases, the program instructions described may be low-level executable code. In some cases, the program instructions may be compiled from a higher-level programming language to low-level executable code, and the low-level executable code may be subsequently processed using the techniques described in the present disclosure. Although it is contemplated as being within the scope of the current disclosure that such techniques may be applied to higher-level program code, an advantage of performing the described techniques on low-level code may be that loops and recursive conditions in higher-level program code are more easily detected and modified when the higher-level program code is compiled into low-level executable code. In various embodiments, such bounds may be placed/inserted into program instructions for all loops and recursive functions that are tagged as having a policy violation. Applying such bounds to inner loops as well as outer loops ensures that an inner loop, such as the inner loop 222, or a recursive function does not become stuck in an infinite loop and never reaches the condition check of outer loop, such as outer loop 224.

Figure 3:
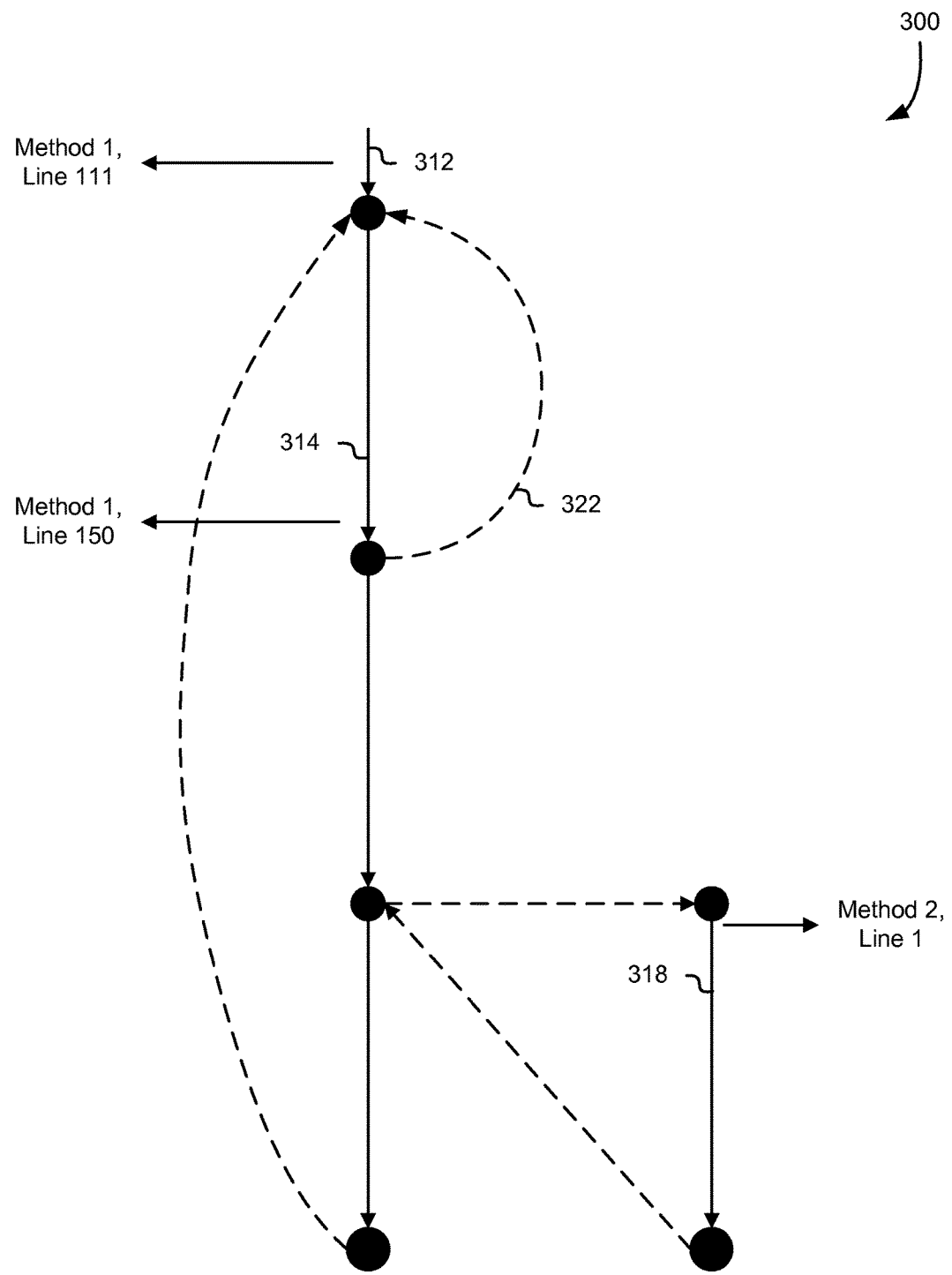
FIG. 3 illustrates an example of indicating changes in remediated instructions in accordance with an embodiment.

FIG. 3 is an illustration of an aspect of an embodiment of the present disclosure. Specifically, FIG. 3 depicts a map 300 between regions of program, such as the portion of the example program 200 of FIG. 2 and particular function descriptions of the program. In some embodiments, the map could include a method name and a line number indicating the areas of the program where code is being inserted. In some cases, the map may have a memory address of the program where code is being inserted as an alternative or in addition to the line number. For example, the programmer could be notified that the program instructions at line 111 of path 312 ("Method 1, Line 111") are being modified to set an initial value of a counter. The programmer could also be notified that the program instructions at line 150 of path 314 ("Method 1, Line 150") are also being modified, for example, to decrement the counter and exit the loop 322 if the counter is zero. Likewise, the programmer may be notified of a modification to line 1 of a subroutine 318 ("Method 2, Line 1). The programmer, having notice, may then be able to analyze the program instructions, see what lines are being referred to, and determine how to modifying the program instructions to bring it into compliance with policy.

Figure 4:
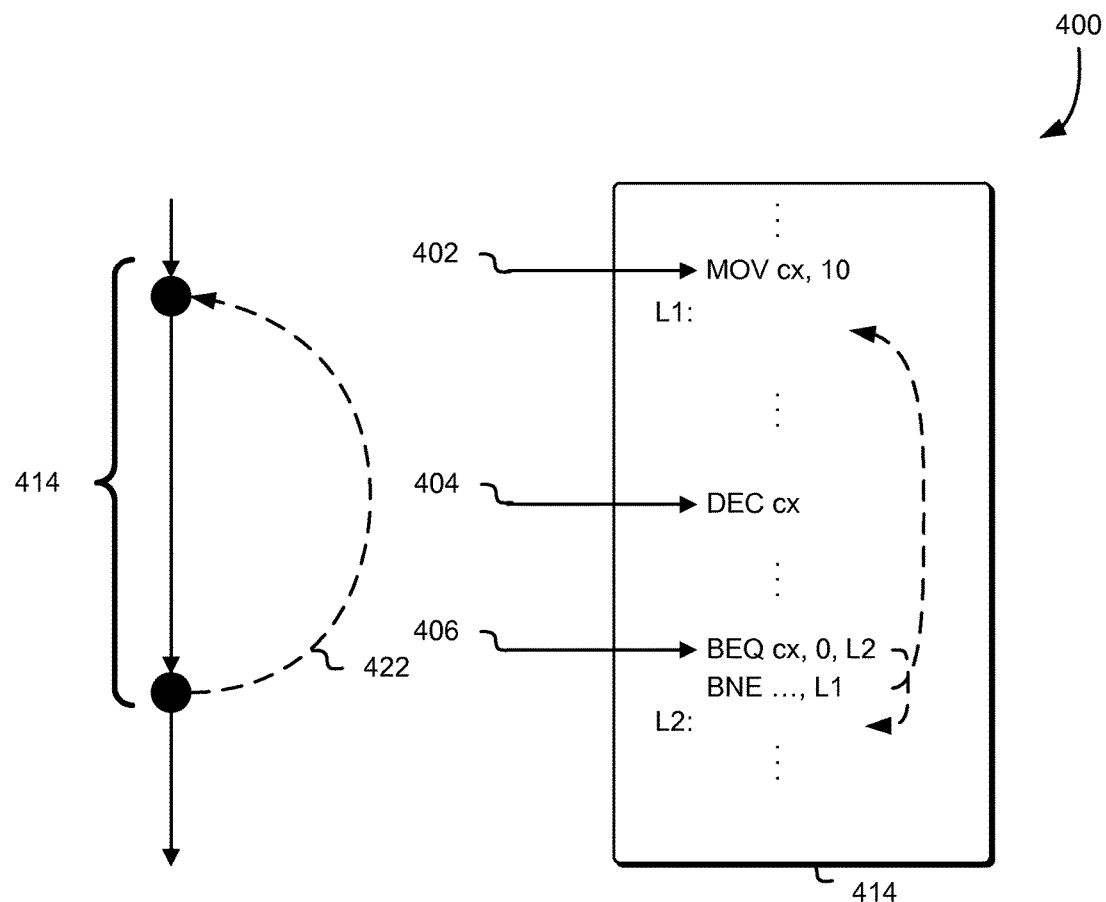
FIG. 4 illustrates an example of inserting a hard constraint in accordance with an embodiment.

FIG. 4 illustrates an example 400 of how program instructions may be modified to bring a code section into compliance with a policy. As illustrated in FIG. 4, the example 400 includes a code section 414 comprising a branch not equal loop 422 that repeats until a certain condition is met. It may be assumed for the example 400 that the loop 422 of code section 414 is in violation of a policy and a policy analyzer has determined that the loop 422 should be limited to no more than 10 iterations. In the example 400, this may be done by inserting line 402 to move a value of 10 into a register, thereby initializing the counter, inserting line 404 within the loop 422 to decrement the register, and inserting line 406 to exit the loop 422 if the register is decremented to zero. Note that, between lines 402-04 and 404-06, additional instructions may be inserted to move the contents of the register to and from a memory address, particularly in the case where the loop 422 is a recursive routine. Note also that the code presented in FIG. 4 is for illustration purposes only, and the actual code injected by the policy analyzer may vary by the type of processor in the computer system, the language of the program instructions, the organization of the program instructions, and the particular embodiment. For example, as an alternative for a recursive routine, the routine and the routine call may be modified to push the counter as a parameter of the routine. Therefore, it is contemplated that any code having the ability to place a bound on a loop or recursive function, including using methods other than counters is within the scope of the present disclosure.

Figure 5:
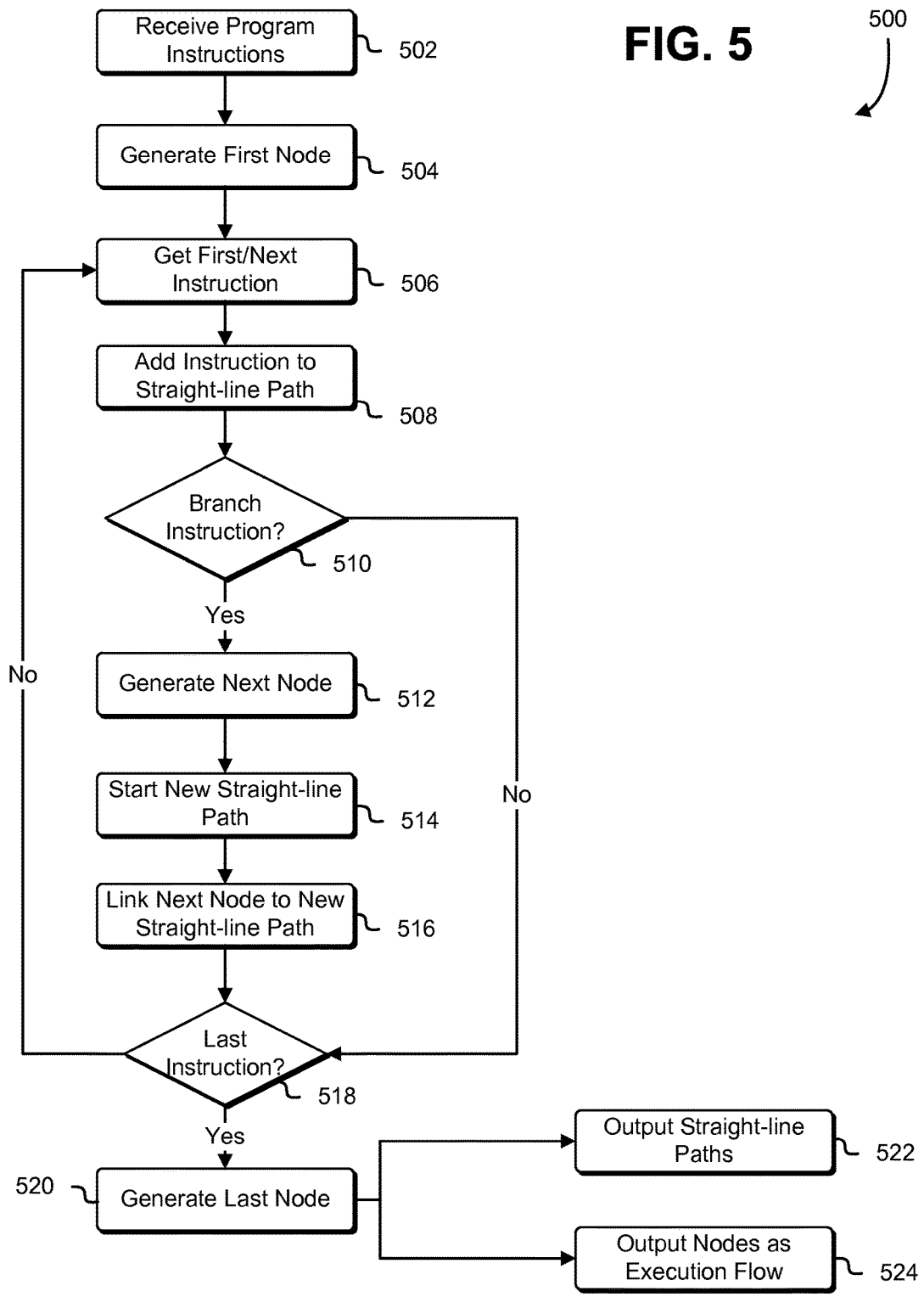
FIG. 5 is a flow chart that illustrates an example of generating execution flows and straight-line paths in accordance with an embodiment.

FIG. 5 is a flow chart illustrating an example of a process 500 for generating straight-line paths and execution flows as may be performed by the code analyzer 104 of FIG. 1 in accordance with various embodiments. The process 500 may be performed by any suitable system such as a server in a data center, by multiple computing devices in a distributed system of a computing resource service provider, or any electronic client device such as the electronic client device 1002 described in conjunction with FIG. 10. The process 500 includes a series of operations wherein a code analyzer, such as the code analyzer 104 of FIG. 1, may parse through the program instructions 102 to generate the straight-line paths 106 and execution flows 108 for output to the code simulator 110 and the policy analyzer 114 respectively.

In 502, the code analyzer may receive program instructions. The program instructions may be a listing of computer-executable instructions provided by a programmer. The program instructions may be provided in the form of a text file or another file type uploaded through a web-services application programming interface, or the program instructions may be provided to a computing resource service provider as a file on a non-transitory computer-readable medium. In some embodiments, the programmer may provide an executable program, whereupon the code analyzer may disassemble the executable program into low-level program instructions suitable for processing according to the present disclosure. In still other embodiments, the programmer may provide an executable program, whereupon the code analyzer may decompile the executable program into higher-level program instructions suitable for processing according to the present disclosure.

In 504, the first node in the execution flow may be created. The execution flow, as described, provides a map as to how the straight-line paths generated by the process 500 are connected. The first node, therefore, indicates the starting point of the execution flow of the program. Also in 504, the first straight-line path may be initialized. In 506, the first instruction of the program instructions is retrieved and, in the execution flow, this first instruction may be linked to the first node; that is, the nodes of the execution flow may be data structures wherein each node indicates connected nodes in the execution flow and identifies a particular straight-line path associated with the execution flow. Using the program 200 of FIG. 2 as an example, the node 208 may indicate that it has the node 226 as a parent, the node 210 as a child, and is associated with the path 218.

In 508, the current instruction is appended to the end of the current straight-line path, and the code analyzer performing the process 500 proceeds to 510. In 510, the code analyzer performing the process 500 may determine if the current instruction is a branching-type instruction; branching-type instructions may include conditional and unconditional branch, jump, and trap instructions. Encountering a branching-type instruction indicates the end of the current straight-line path and the beginning of a new straight-line path as well as the end of the current node and the beginning of a new node in the execution flow. Thus, the branching-type instruction may be included in the straight-line path and the linkage to the next straight-line path. Note that record-keeping for branching-type instructions may vary; for example, the process 500 of FIG. 5 would place branching-type instructions at the end of the current straight-line path, however, the branching-type instruction could alternatively be placed at the beginning of the next straight-line path. Note too that in some embodiments where annotations may be embedded within the program instructions indicating portions of the program that may not be changed by a code processor, such as described in detail in FIG. 5, such a special annotation may cause the current node to end and a new node to be generated for the execution flow, and as an end to the current straight-line path and the beginning of a new straight-line path.

If the instruction analyzed in 510 is not a branching-type instruction or a special annotation, then it is presumed that the instruction belongs in the current straight-line path and the code analyzer performing the process 500 proceeds to 518. Otherwise, if a branching-type instruction was encountered, the code analyzer performing the process 500 proceeds to 512, whereupon a new node is generated for the execution flow. As described, the new node may indicate one or more parent nodes, one or more child nodes, and an associated straight-line path. Note also that although the process 500 depicted in FIG. 5 generates the set of straight-line paths and the graph of the execution flows within the same process, in some embodiments the set of straight-line paths and execution flows may be generated by separate processes.

In 514, a new straight-line path may be initialized to be the current straight-line path, and in 516 the new straight-line path may be associated with the new node generated in 512. Note that in some instances, a branching-type instruction may refer back to a point in a straight-line path that has already been processed; in such a case, the straight-line path may be split into two straight-line paths and an artificial node may be inserted. For example, a program may start at offset 10 in the executable instructions and continue through the straight-line path of instructions to offset 20. However, sometime later, there may be a jump instruction to an instruction at offset 14. In such a case, the straight-line path from 10-20 may be broken into a straight-line path from 10-13 and 14-20, and the original straight-line path becomes two consecutive straight-line paths, even though there is no branch in the middle. An artificial node to reflect that there is an external jump into the middle of the straight-line path may be effectively created in this manner. Then, in 518, the code analyzer performing the process 500 determines whether it has reached the last instruction of the program instructions. If more instructions in the program instructions remain to be analyzed, the code analyzer performing the process 500 returns to 506, whereupon the code analyzer retrieves the next instruction of the program instructions.

Otherwise, if the last instruction of the program instructions has been reached, the code analyzer proceeds to 520, whereupon a final node in the execution flow is generated. The final node may be distinguishable from other nodes in many ways, including that the final node may not have any child nodes or associated straight-line paths. Generation of the final node indicates that the execution flow of the program has been completed and all straight-line paths of the program instructions have been cataloged. Consequently, in 522, the code analyzer may output the collection of straight-line paths to a code simulator, such as the code simulator described in FIG. 6 and, in 524, output the set of nodes representing execution flow to a policy analyzer, such as the policy analyzer described in FIG. 7, for further processing. Note that the operations performed in 502-24 may be performed in various orders and combinations, including in parallel.

Figure 6:
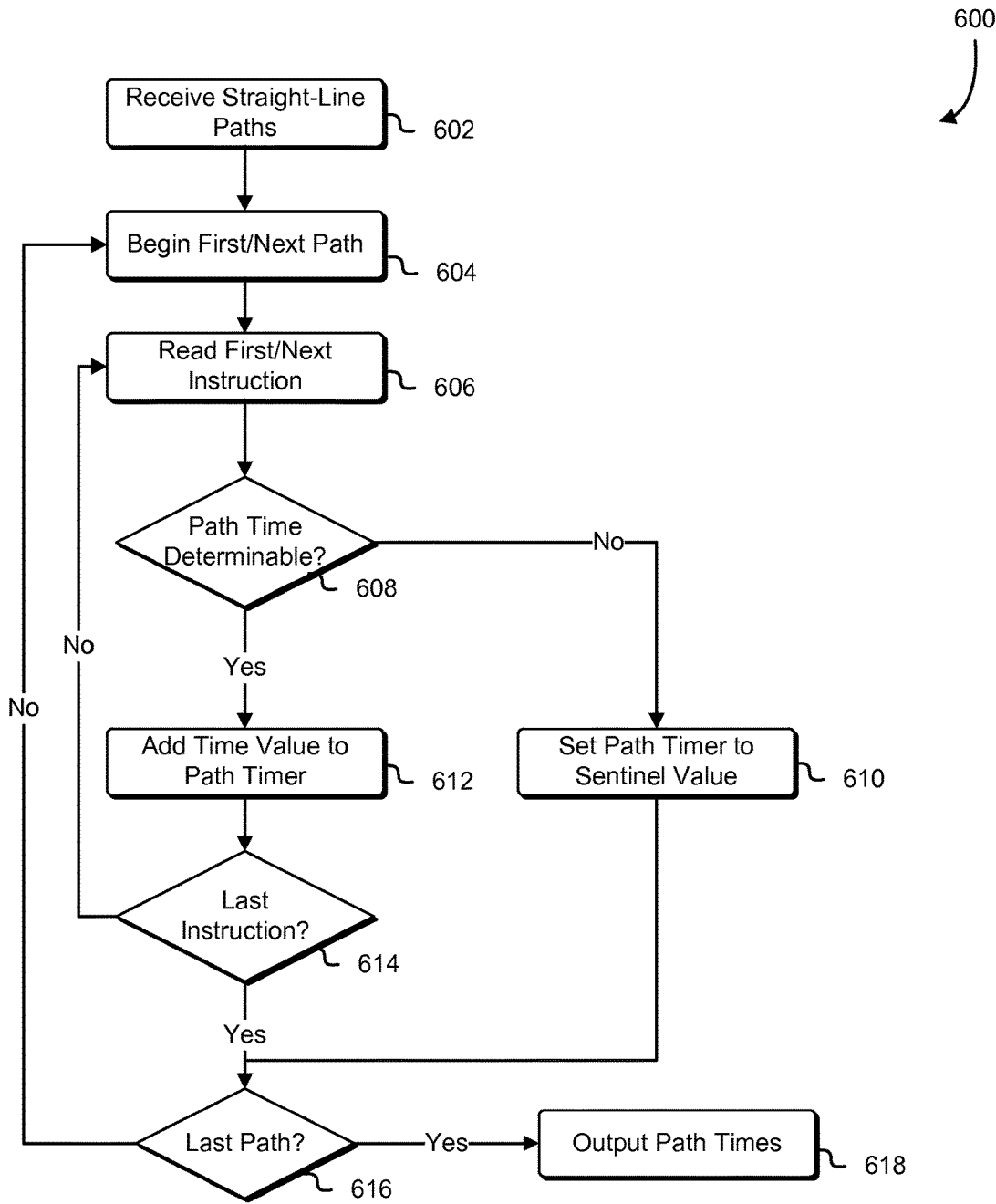
FIG. 6 is a flow chart that illustrates an example of determining straight-line path times in accordance with an embodiment.

FIG. 6 is a flow chart illustrating an example of a process 600 the code simulator 110 of FIG. 1 may follow to determine the path times 112 of the straight-line paths 106 of the program instructions 102 in accordance with various embodiments. The process 600 may be performed by any suitable system acting as a code simulator, such as a server in a data center, by multiple computing devices in a distributed system of a computing resource service provider, or any electronic client device such as the electronic client device 1002 described in conjunction with FIG. 10. The process 600 includes a series of operations wherein the code simulator analyzes each instruction from a series of straight-line paths to determine path times for each straight-line path. In 602, a series of straight-line paths are received from the code analyzer. As described, straight-line paths comprise a set of program instructions between program instructions that cause program execution to branch or jump to another target location in the list of program instructions. Examples of branching instructions include unconditional branch, branch on equal, branch greater than or equal to zero, branch greater than zero, branch less than or equal to zero, branch less than zero, branch not equal, unconditional jump, jump register, and trap on equal. Note that the branching instructions may vary based on the type of processor utilized for executing the instructions. Note also, that while such program instructions are disclosed in terms of low-level program instructions, it is also contemplated that the present disclosure may be applied to higher-level programming languages as well.

In 604, the code simulator begins processing the first straight-line path of the series of straight-line paths. A path timer for the particular straight-line path may be initialized to an empty value (e.g., zero) in this operation. In 606, the first instruction in the straight-line path is read, and in 608, the time—such as the number of instruction cycles sufficient to process the instruction—is determined. Note that in some cases, the number of instruction cycles sufficient to process the instruction may be an estimation of how many instruction cycles may be required most of the time to process the instruction. In other cases, the number of instruction cycles sufficient to process the instruction may be a worst-case determination of how many instruction cycles may be required to process the instructions. In still other cases, the number of instruction cycles sufficient to process the instruction may be an estimation, as described above, padded with a buffer amount of instruction cycles to account for variations in the number of instruction cycles required to process the instruction. A variety of different methods of determining a time value for a straight-line path is possible. For example, in some cases, this may be done by cross-referencing the instruction against a map of instructions and their respective known timing values. However, because in some cases the order of the instructions in the straight-line path may affect their individual time values, determining a time value may comprise a programmatic or rules-based scheme where the order of the instructions may be one of many factors in determining time values for straight-line paths.

In other cases, each instruction may be given the same value (e.g., one) and the operations 606-16 may just count the number of instructions in the straight-line path. In still other cases, each instruction may be simulated and timed (e.g., in system clock cycles) to return a time value. In some cases, timing values for the branch-type instructions at the start and/or end of the straight-line path may also be aggregated with the path timer for the particular straight-line path, whereas in other cases timing values for branching instructions may be considered negligible and consequently not counted. Note that other ways of determining a path time are contemplated as being within the scope of this disclosure.

However, if the path time for the instruction cannot be determined (for example, if the instruction is not known by the code simulator and/or cannot be found in a timing map for instructions), the path timer for the particular straight-line path may be set to a sentinel value, such as a null, large number, best estimate, or infinite value, in 610. This may cause further evaluation of the particular straight-line path to terminate and the code simulator performing the process 600 may proceed to 516. Otherwise, if the path time for the instruction is determined, the path timer for the particular straight-line path may be incremented by the determined path time in 612, whereupon the code simulator performing the process 600 may proceed to 614 to determine if more instructions in the straight-line path remain to be processed.

In 614, the code simulator performing the process 600 checks whether the current instruction pointed at is the last instruction of the straight-line path. If further instructions remain to be processed, the code simulator performing the process 600 may return to 606, whereupon the next instruction in the straight-line path is read and its timing value determined in steps 606-12 as described above. However, if all instructions in the particular straight-line path have been processed or simulated, the code simulator performing the process 600 proceeds to 616.

In 616, the code simulator performing the process 600 determines whether more straight-line paths remain to be processed. If the current straight-line path is not the last in the series, the code simulator performing the process 600 returns to 604 to begin to process the instructions in the next straight-line path in the series. In this case, a new path timer for the next straight-line path in the series may be initialized to an empty value (e.g., zero).

Otherwise, if no more straight-line paths remain unprocessed, the code simulator performing the process 600 may proceed to 618, whereupon a series of the path times 112 associated with the corresponding straight-line paths 106 may be output to the policy analyzer 114 of FIG. 1. Note that the operations performed in 602-18 may be performed in various orders and combinations, including in parallel. For example, 608 may separate the check whether the time value is determinable from determining of the time value. Alternatively, in some cases, both operations may be performed with an instruction to obtain the time value and error-trapping code if the time value could not be obtained. In other cases, timing values for all instructions may be presumed to be known and no determination may be made whether the time value is determinable. In still other cases, if the time value cannot be determined or determined accurately, a default value (e.g., time for an average instruction) may be used for the time value; in such cases, the operations of 610 may be omitted.

Figure 7:
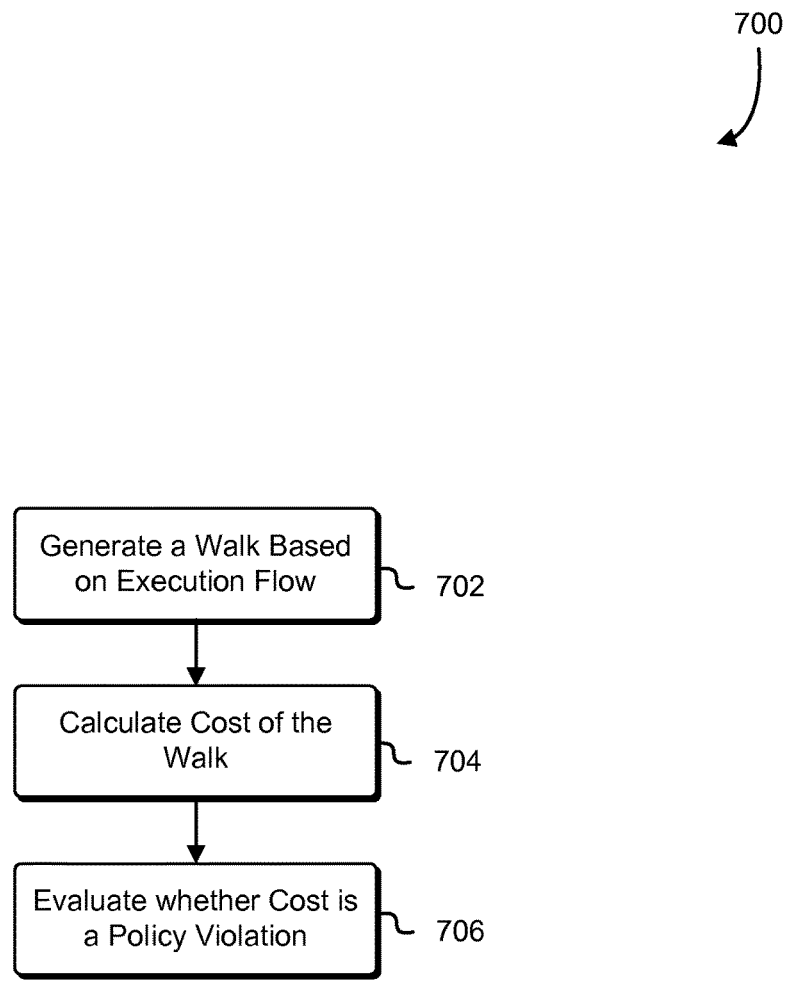
FIG. 7 is a flow chart that illustrates an example of validating program instructions against a policy in accordance with an embodiment.

FIG. 7 is a flow chart illustrating an example of a process 700 for determining policy violations as may be performed by the policy analyzer 114 of FIG. 1 in accordance with various embodiments. The process 700 may be performed by any suitable system acting as a policy analyzer, such as a server in a data center, by multiple computing devices in a distributed system of a computing resource service provider, or any electronic client device such as the electronic client device 1002 described in conjunction with FIG. 10. The process 700 includes a series of operations wherein a policy analyzer, such as the policy analyzer 114 of FIG. 1, receive the execution flows 108 of program instructions 102 from the code analyzer 104, and traverse the execution flows 108, summing the path times 112 received from the code simulator 110, and comparing the results against the policy 116 associated with the program instructions 102.

In 702, after receiving the execution flow, the system performing the process 700 may compute a walk through the nodes of the execution flow. Because the execution flow may be a graph having nodes connected by edges, the execution flow may be walked in a similar manner as a graph. That is, beginning with the first node (vertex), the walk may follow the edge of that vertex to the next-linked vertex. As branch vertices are encountered, the walk may loop back to previous vertexes and re-walk the intervening edges; thus, as each edge is walked, it may be counted or incremented in weight.

When computing the walk, if the system performing the process 700 is unable to determine a terminating condition, such as if a same path is walked more than a threshold number of times, the intervening edges may be weighted with a sentinel value, such as a large number guaranteed to violate the policy or an infinite value, and the intervening edges may be flagged as fully walked and the walk may proceed to the next non-fully walked edge/vertex in the execution flow. Once the walk reaches the last vertex in the graph and no further branches are required, the walk may end and the system performing the process 700 may proceed to 704.

Note that in other cases, the number of times that edges may be walked may differ based on various factors, such as, for example, if a looping condition depends on an external input value received from a user, application, or device. In these cases, the system performing the process 700 may compute walks using different estimations of the input value. Based on these estimations, the system may be able to generate confidence scores for the number of times each edge may be walked; e.g., the system may determine that 60% of the time, edge 14 may be walked 25 times or less, and 90% of the time, edge 14 will be walked 40 times or less.

In 704, the total cost of the walk may be computed. To compute the total cost of the walk, the path times determined by a code simulator, such as the code simulator 110 of FIG. 1, according to a process similar to the process 600 of FIG. 6, may first be mapped to their corresponding edges of the execution flow. Once mapped, the weights of each of the edges as determined by the walk in 702 may be multiplied by their corresponding path costs to determine the actual path costs of the execution flow, and the sum of these actual path costs may be the total cost of the walk. Furthermore, edges having large actual path costs due to having many loops, instructions, or sentinel values may be identified straight-line paths contributing to a policy violation, as well as an estimation of the actual contribution of each straight-line path to the total execution time of the program may be determined. Additionally, if confidence scores were calculated in 702, the system may apply the confidence scores to obtain confidence scores for the actual path costs; e.g., the system may determine that 60% of the time, straight-line path 14 may consume 250 instruction cycles, and 90% of the time, straight-line path 14 may consume 400 instruction cycles.

In 706, the policy for the program may be retrieved. In some cases, the policy may be kept in a data store, such as the data store 115 described in conjunction with FIG. 1. As noted, the policy may be a service-level agreement and may reflect a time bound, maximum number of execution cycles, maximum number of instructions, or other unit for measuring whether the program can exceed an execution policy. Other types of policies include policies limiting an amount of memory that program execution may take and policies limiting direct access to hardware by the program; remediated instructions may be generated with constraints on these types of policies and service-level agreements as well as constraints on time and/or instruction cycles. If the total cost of the walk calculated in 704 exceeds the policy, the system performing the process 700 may then output the policy violations. The policy violations may include, among other data, information identifying which policies were violated and by how much, a list of the straight-line paths containing policy violations and the actual path cost of each of the straight-line paths violating a policy. In some cases, the output may also include the complete set of straight-line path and execution flows, which may be utilized by a code processor for determining where to insert any bounding constraints.

In some cases, such as where the code processor may be iteratively inserting different remediation instructions into the program instructions to determine the appropriate modifications for the program instructions, the policy analyzer may output timing values and other statistics to the code processor even if the no policy violations were found. Using this information, the code simulator may be able to determine the appropriate modifications to make to the program instructions.

Figure 8:
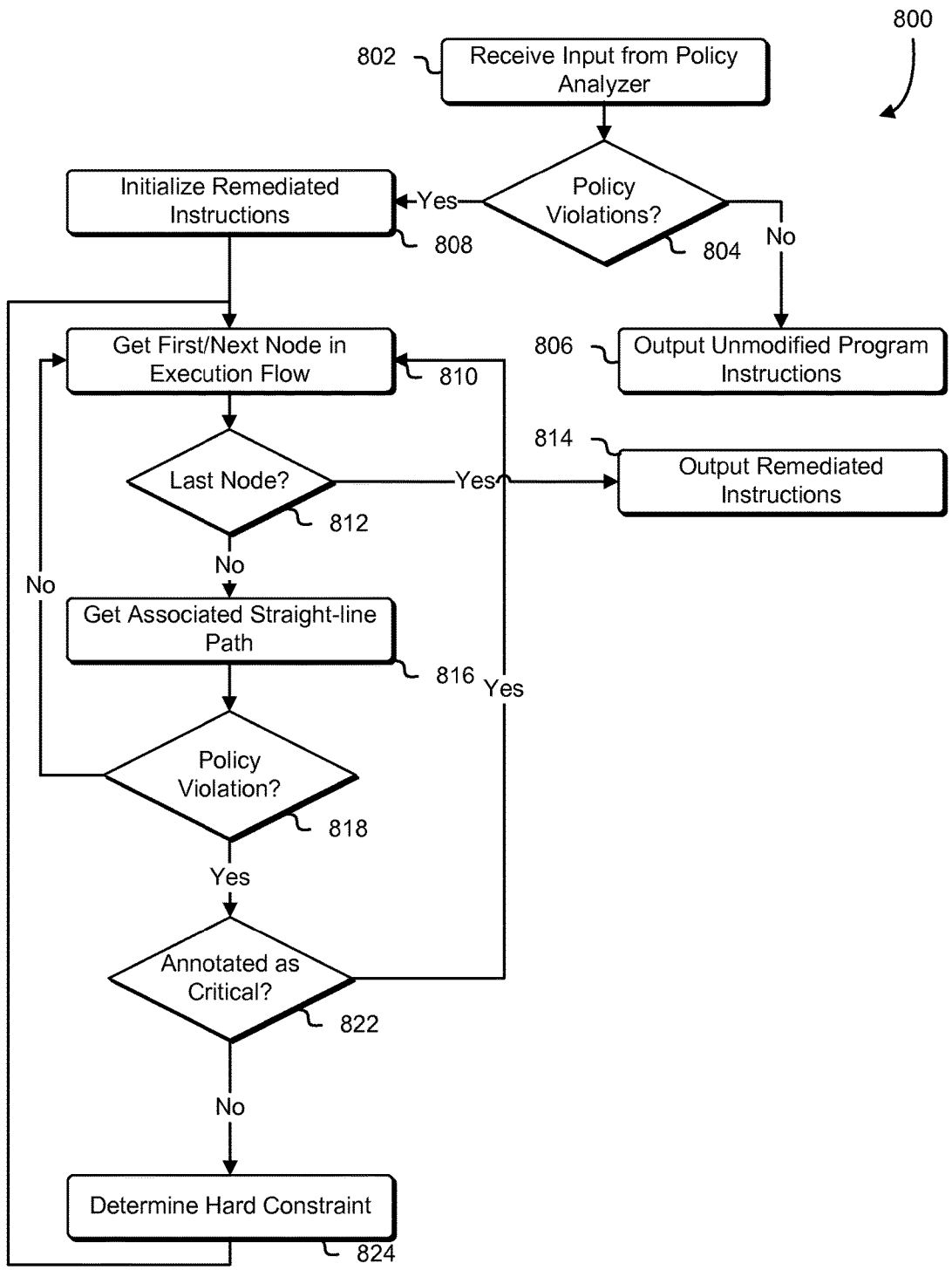
FIG. 8 is a flow chart that illustrates an example of generating remediated instructions in accordance with an embodiment.

FIG. 8 is a flow chart illustrating an example of a process 800 for remediating program instructions as may be performed by the code processor 120 of FIG. 1 in accordance with various embodiments. The process 800 may be performed by any suitable system acting as a code processor, such as a server in a data center, by multiple computing devices in a distributed system of a computing resource service provider, or any electronic client device such as the electronic client device 1002 described in conjunction with FIG. 10. The process 800 includes a series of operations wherein a code processor, such as the code processor 120 of FIG. 1, may evaluate the list of policy violations 118 received from the policy analyzer 114, and insert remediation instructions into the program instructions 102 to produce the remediated instructions 122 that comply with the policy 116.

In 802, the code processor performing the process 800 receives input from a policy analyzer. The input may be a collection of policy violations found during an analysis of the program instructions or, if no policy violations were found, the input may be a notification that the program instructions comply with one or more policies associated with the program instructions. The policy violations may indicate which policy of one or more policies were violated, the line numbers in the program instructions encompassing code that violates the one or more policies, and may also indicate in which lines of the program instructions remediation instructions should be inserted to bring the program instructions into compliance with the policy. In some embodiments, rather than indicating the location of the policy violations and/or insertion points for remediation instructions in the program instructions, the collection of policy violations may instead indicate which straight-line paths and/or execution flows have policy violations and locations in such straight-line paths of the policy violations and/or insertion points for remediation instructions. In some embodiments, the input from the policy analyzer may include the execution flows and straight-line paths generated by the code analyzer for reconstructing the program instructions and generating the remediated instructions, whereas in other embodiments the code processor may generate the remediated instructions using the original program instructions and information supplied with the collection of policy violations by the policy analyzer.

Based on this input, the code processor performing the process 800 makes a determination in 804 whether the program instructions contain policy violations. If no policy violations were found by the policy analyzer, then the program instructions may be presumed to be in compliance with the policy, and the code processor performing the process 800 may proceed to 806. In 806, the code processor may notify a programmer of the program instructions and/or a computing resource service provider hosting one or more computer systems upon which the program instructions are configured to execute, that no policy violations have been found with the program instructions. In some cases, this notification may comprise providing the original program instructions to the programmer to confirm that no modifications have been made to the program instructions. In other cases, the notification may be an acknowledgement that the program instructions comply with the policy on record. Alternatively or additionally, the program instructions may be provided to the computing resource service provider for implementation/installation on designated computer systems. In some of these cases, the program instructions may be digitally signed by the code processor as an attestation that the program instructions have been verified as complying with the policy.

However, if the program instructions contain policy violations, the code processor performing the process 800 proceeds to 808, whereupon the code processor begins the process of generating remediated instructions to comply with the policy. In the embodiment depicted in FIG. 8, the code processor reconstructs the program instructions with reference to the execution flows and the straight-line paths, inserting remediation instructions where appropriate. In other embodiments, information received from the policy analyzer may include indications of where remediation instructions may be inserted into the original program instructions, and reconstruction of the program instructions from the execution flows and straight-line paths may be omitted from the process 800. In 808, a set of remediated instructions may be initialized to an empty value (e.g., an empty string), and in 810 the first node of the execution flow may be read. In some embodiments, the code processor may be provided the execution flow by the policy analyzer 114, whereas in other embodiments the code processor may be provided the execution flow by the code analyzer 104.

In 812, the code processor performing the process 800 checks whether the current node is the last node of the execution flow, which may indicate that the reconstruction and remediation of the program instructions of operations 810-28 are to be complete. Thus, if the generation of the remediated instructions are complete, the code processor performing the process 800 proceeds to 814, whereupon the remediated instructions may be output. As with the output of unmodified program instructions of 806, the output of the remediated instructions may be provided to a programmer of the program instructions, and/or a computing resource service provider hosting one or more computer systems upon which the program instructions are configured to execute. The output may include human-readable annotations in the remediated instructions indicating the lines that may have been inserted into the program instruction methods or, alternatively, human-readable information indicating which lines may have been inserted (i.e., indicating the differences between the remediated instructions and the original program instructions) into the program instruction methods may be provided in a separate message or file. Note that although the above example describes inserting lines of code, it is contemplated that binary instructions may alternatively be inserted rather than actual lines of code. In some cases, this output may comprise providing the remediated instructions to the programmer to allow the programmer to approve the changes made or to allow the programmer to replace the changes made in order to bring the program instructions into compliance in a different manner than determined by the code processor. Alternatively or additionally, the remediated instructions may be provided to the computing resource service provider for implementation/installation on designated computer systems. In some of these cases, the remediated instructions may be digitally signed by the code processor as an attestation that the remediated instructions have been verified as complying with the policy.

Otherwise, if the current node in the execution flow is not the final node, the code processor performing the process 800 proceeds to 816, whereupon the straight-line path associated with the current node may be obtained. In some embodiments, the code processor may be provided the straight-line paths by the policy analyzer 114, whereas in other embodiments the code processor may be provided the straight-line paths by the code analyzer 104. The straight-line path associated with the current node may be a straight-line path that links the current node to the next node. For example, in FIG. 2, the path 214 would be the straight-line path associated with the node 202 and the path 216 would be the straight-line path associated with the node 204 in this context.

In 818, the code processor performing the process 800 may determine, based on input received in 802 from the policy analyzer, whether the current node and associated straight-line path violate one or more policies associated with the program. If so, in the embodiment illustrated in FIG. 8, the code processor performing the process 800 may proceed to 822 to check whether annotations exist in the straight-line path that tag the code as not to be modified. In embodiments without such annotation support, the code processor performing the process 800 may proceed to 824 if policy violations are detected.

In some embodiments, the code processor may reconstruct the program instructions using the straight-line paths and the execution flow. In such embodiments, if no policy violations are detected with the straight-line path associated with the current node, the straight-line paths associated with the current node of the execution flow may be added to the set of remediated instructions here, and, after adding the straight-line path to the set of remediated instructions, the code processor performing the process 800 may proceed 810 to fetch the next node in the execution flow. In other embodiments, the code processor may use information received from the policy analyzer to determine where hard constraints may be inserted in the original program instructions, and in such embodiments the program instructions may not be reconstructed using the straight-line paths and the execution flows.

In some embodiments, the system of the present disclosure may permit the programmer to annotate the program instruction in order forbid the code processor to modify annotated portions of the program instructions (e.g., for portions of the program instructions critical to the functioning of the program). These embodiments may be represented by 822, which may determine whether such an annotations are present in the straight-line path. In such cases, the code processor may be configured ensure that the remediated instructions comply with the annotations by not inserting remediation instructions within the annotated portions. Program instructions may be annotated in a variety of ways, including adding a unique character string (e.g., "*BEGIN CRIT*," "*END CRIT*," etc.) in a text remark within the program instructions at the beginning and end of the critical portions of the program, such as:

```
; *BEGIN CRIT*
main proc
    mov ah, 9
    . . .
    retn
main endp
end main
; *END CRIT*
```

Note that, in some cases, a single annotated portion may span multiple nodes and straight-line paths and, in these cases, 818 may function as a virtual toggle switch. For example, when the beginning of a portion of the program instructions annotated as critical is detected, the code processor performing the process 800 may automatically proceed from 822 to 810 for all future straight-line paths in the execution flow, ignoring any policy violations, until the end of the portion of the program instructions annotated as critical is detected, whereupon policy violations may be processed as normal. Even though the critical portion of the program may remain unmodified, if the critical portion of the program contains a policy violation, this information may be logged to provide the programmer with notice that the critical portion of the program contains one or more policy violations and may not be permitted by the computing resource service provider to execute until the program is brought into compliance with the policy. In some of these cases, the code processor may propose changes to the critical portions of the program instructions to the programmer that may bring the program into compliance with the policy. In still other embodiments, the annotations may not prevent the code processor from modifying the critical portion, but rather may serve to cause the code processor to notify the programmer that a critical portion of the program has been modified in the remediated instructions. In some cases, this notification may be in the form of a human-readable annotation/comment within the remediated instructions, whereas in other cases the notification may be in the form of an alert or message sent to the programmer.

However, if the straight-line path associated with the current node has been flagged as containing a policy violation and not annotated as a portion of the program instructions that may not be changed, the code processor performing the process 800 may proceed to 824, whereupon the code processor may determine how to constrain the code such that the code does not violate the policy. For example, the policy analyzer may have determined from the policy that the program instructions must finish within 1,000 instruction cycles and may have further determined that, in the execution flow, certain of the straight-line paths will consume 10,000 of those instruction cycles, leaving 5,000 instruction cycles to be shared among code portions identified as violating one or more policies. Expanding this example, assuming that the policy analyzer has identified a loop corresponding to the straight-line path associated with the current node as having a policy violation because a maximum number of iterations of the loop could not be determined or because a determined maximum number of iterations may exceed the time constraints of one or more policies of the program instructions, and assuming that a single iteration of the straight-line path consumes 500 instruction cycles, in this example, the code processor may determine that a hard constraint of ten iterations of the loop may be permitted without violating policies corresponding to the program instructions.

Likewise, if the straight-line path and current node have determinable maximum iterations, but executing the straight-line path for the determined maximum number of iterations may exceed a policy of the program instructions, a similar hard constraint could be generated to ensure compliance with the policy. In the case where multiple straight-line paths associated with different nodes in the execution flow are flagged as violating policy, various schemes for determining hard constraints for each policy violation may be utilized, including schemes based on apportioning available instruction cycles between each policy violation and proportional schemes based on the number of instructions in the relevant straight-line paths. Similar methods may be used for limiting the number of nested levels of recursive functions where such recursion may violate one or more policies of the program.

Note that in complex looping situations, such as one or more inner loops/calls may be within an outer loop/call, and one or more loops/calls may be within the one or more inner loops/calls, etc., different principles may be applied to determine an amount and placement for the hard constraints. For example, one design principle may be to minimize the size and number of modifications made to the program. Using that design principle, the bound may be placed on the outermost loop. However, based on the complexity of the inner loops, this may result in a very tight constraint; that is, it may result in limiting the outermost loop to a very small number of iterations before the total count would be exceeded. Another design principle may be to, as closely as possible, make modifications that model the original behavior of the program. Using that design principle, bounds may instead be placed on one or more of the innermost loops. However, this may require more modifications to the original program. Thus, in some embodiments, a balance between design principles may be determined. In other embodiments, hard constraints/bounds may be initially placed on innermost loops or loops contributing the most to the policy violation and the remediated instructions may be re-evaluated by the code analyzer, code processor, and policy analyzer. After re-analysis, the bounds may be instead placed on outer loops (or next outer of the inner loops) or loops contributing the next-most to the policy violation, and the remediated instructions may again be re-evaluated. This process may continue iteratively, and the results may be compared to determine which modification provides results in the most satisfactory result.

Note that confidence scores determined by the code simulator may be used to determine whether to insert other types of code, such as code for a watchdog timer, in the program instructions. For example, if a confidence score is less than 100% or some other threshold, code for a watchdog timer may be inserted for the purpose trigger the program to terminate a loop or terminate execution if an execution time, number of instruction cycles, or other measurable condition exceeds a threshold. Additionally or alternatively, other types of code, such as error trapping code and code that may constrain an amount of memory used by the program may also be inserted.

Using the determined constraints the code processor may insert remediation instructions into the original program instructions to limit the execution time of the portions of the program instructions flagged as violating a policy. These modified instructions are referred to as remediated instructions. Using the example above, the code processor may generate remediation instructions that initializes a counter (e.g., to zero), increments the counter and, after ten iterations, and exits the loop. The code processor may insert these remediation instructions into appropriate locations within the original program instructions. Alternatively, in embodiments where the code processor reconstructs the program instructions from the straight-line paths and execution flows, the code processor may insert these remediation instructions into appropriate locations within the current straight-line path and then append the modified straight-line path to the remediated instructions. Note that in many cases, the appropriate locations for inserting the remediation instructions may be at or near the nodes (that is, the locations in the program instructions corresponding to the nodes in the execution flow). Then, the code processor performing the process 800 may return to 810 to retrieve the next node in the execution flow. Note that the operations performed in 802-24 may be performed in various orders and combinations, including in parallel.

Note that, in some cases, after the code processor has generated the remediated instructions, the remediated instructions may be re-processed through the code analyzer, code simulator, and policy analyzer to verify that the inserted constraints bring the program instructions into compliance with the policy. Furthermore, as noted, the code processor may, in some embodiments, receive information from the policy analyzer detailing locations in the program instructions where remediation instructions may be inserted and the code processor may also receive information regarding the constraints to apply to portions of the program instructions. In such embodiments the operations performed in 810-16 and 824-28 may be replaced with operations that, for each policy violation, insert hard constraints directly into the original program instructions, except for code portions annotated as critical, in order to produce the remediated instructions.

As noted, in some cases, after the remediated instructions have been generated, the remediated instructions may be re-evaluated by the code analyzer, the code simulator, and the policy analyzer to confirm how well the changes made address the policy violations, This process may continue iteratively until it is determined which modifications to the program instructions may be the most appropriate, such as which modifications provide the best balance between a design principle of making fewer modifications to the original program instructions and a design principle that makes modifications that more closely-match the original behavior of the program.

Figure 9:
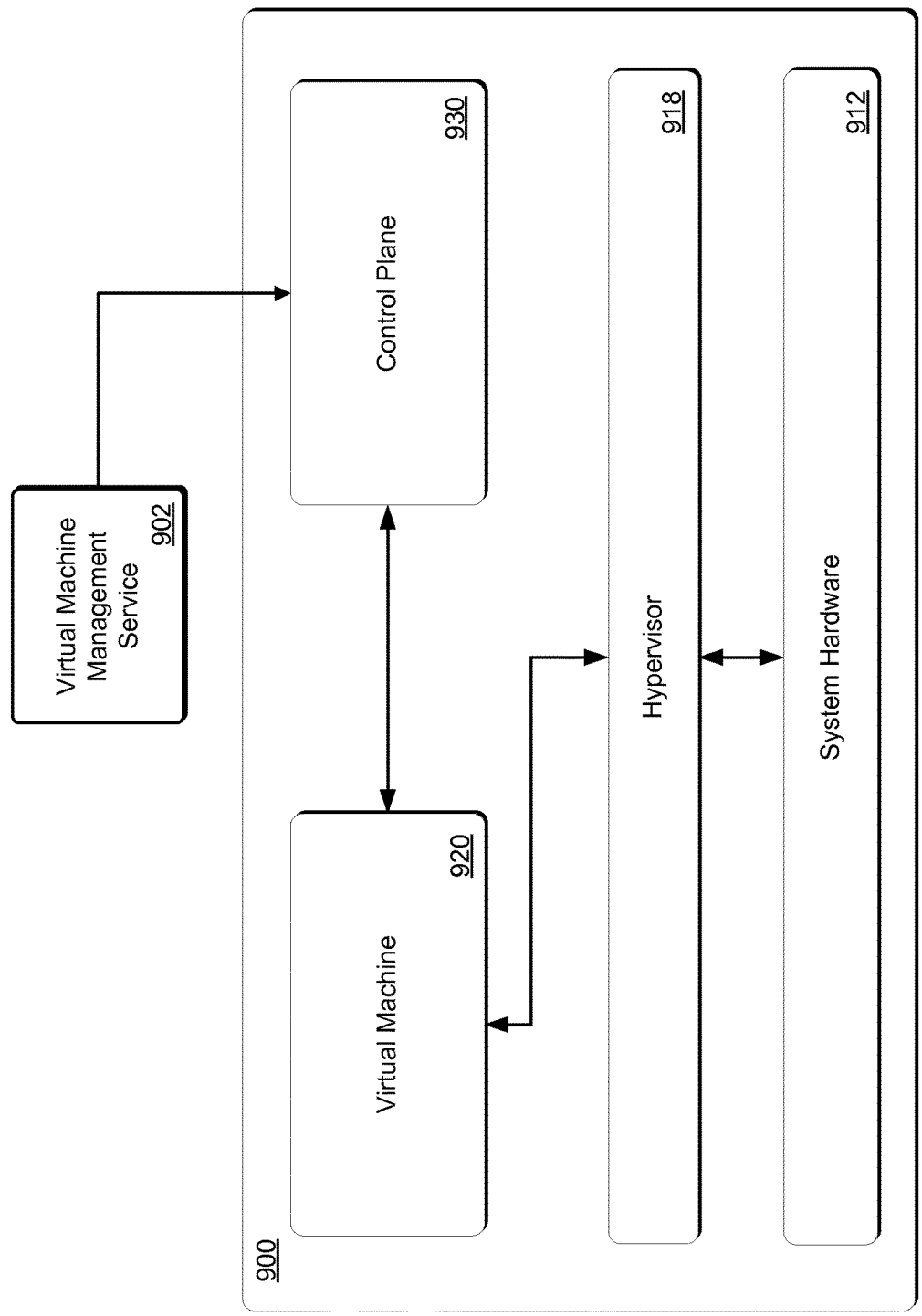
FIG. 9 shows an illustrative example of an environment in which various embodiments can be practiced.

FIG. 9 is an illustrative example of a computer system 900 usable with various embodiments of the present disclosure. Techniques described herein are applicable to supporting multiple virtualization layers in a distributed computing environment. Accordingly, FIG. 9 shows the computer system 900 including system hardware 912. System hardware 912 may include one or more processors, such as a central processing unit (CPU), memory (including static and dynamic memory), buses, input and output devices and storage devices. The system hardware 912 may support a hypervisor 918. The hypervisor 918 may be a bare metal or hosted hypervisor and the hypervisor 918 may manage a virtual machine 920. For simplicity, only one virtual machine 920 is shown in FIG. 9, although the hypervisor 918 may manage a plurality of virtual machines. The virtual machine 920 may execute a customer application or may be one of a plurality of virtual machines executing the customer application. The virtual machine 920 may also execute an operating system such as WINDOWS® or LINUX®. Furthermore, the virtual machine 920 may be a parent partition or root partition configured to communicate with the hypervisor 918 and manage one or more child partitions or user partitions.

The virtual machine 920 may be communicatively coupled with a control plane 930 through a host-only private network. The control plane 930 may be a virtual machine configured to enable the service provider to support multiple virtualization infrastructures by at least translating hypervisor commands, providing networking support and input and output support. The control plane 930 may execute user-level and kernel-level components in order to provide virtualization support. The control plane 930 may contain a networking component, a storage component and a management component. The control plane 930 may support multiple virtualization infrastructures by enabling a virtual machine management service 902 to issue a single type of command regardless of the particular type of hypervisor executing on the computer system 900. For example, the virtual machine management service 902 may transmit the same command to instantiate virtual machine 920 regardless of the particular type of hypervisor 918. The command may be transmitted to control plane 930, and control plane 930 may translate the command such that the command may be executed by hypervisor 918.

The virtual machine management service 902 may be a collection of computing resources collectively configured to manage one or more virtual machines executing on the computer system 900. Customers of the computing resource service provider may interact with the virtual computer systems' service (via appropriately configured and authenticated API calls) to provision and operate virtual machine 920 instantiated on system hardware 912 hosted and operated by the service provider. As described above, the virtual machine 920 may be used for various purposes, such as to operate as servers supporting a website, to operate business applications or, generally, to serve as computing power for the customer. Other applications for the virtual machine 920 may be to support database applications, electronic commerce applications, business applications, and/or other applications. The virtual machine management service 902 may allow the customer and the service provider to manage virtual machine 920.

Figure 10:
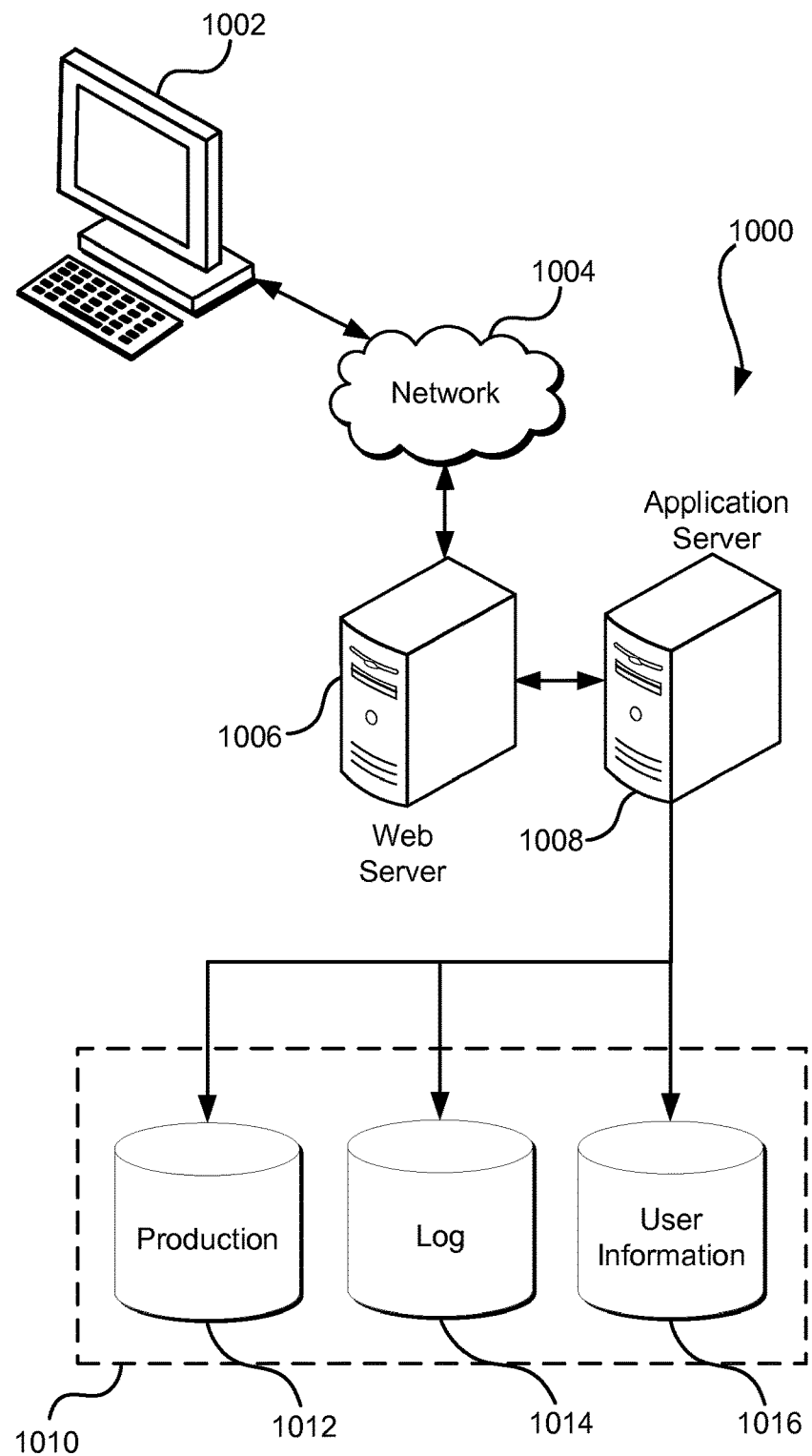
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used.

The illustrative environment includes at least one of the application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining one or more policies associated with a set of program instructions for an executable computer program, wherein the one or more policies indicate a time constraint for execution of the computer program;
identifying a policy violation by evaluating the one or more policies and the set of program instructions;
generating, based at least in part on the policy violation, remediation instructions; and
inserting the remediation instructions into a routine of the set of program instructions running in a virtual computing environment to modify the routine in response to the set of program instructions violating the one or more policies while running in the virtual computing environment, wherein the remediation instructions cause the set of program instructions to be in compliance with the one or more policies.

2. The computer-implemented method of claim 1, wherein the policy violation is added to a collection of policy violations as a result of determining that a number of iterations of a loop can exceed a threshold during evaluating a set of execution flows, a set of straight-line paths, and a set of path times.

3. The computer-implemented method of claim 1, wherein the set of program instructions is a hypervisor plug-in configured to have direct access to hardware of a computer system.

4. The computer-implemented method of claim 1, wherein the remediation instructions cause the set of program instructions to comply with the one or more policies by terminating a loop after a specified number of iterations.

5. The computer-implemented method of claim 1, wherein inserting the remediation instructions comprises:
obtaining from the one or more policies an overall time budget for execution of the set of program instructions;
determining a remaining time budget by deducting a set of path times from the overall time budget;
determining, based at least in part on a remaining time budget, a limit to a number of times that instructions in a straight-line path of a set of straight-line paths are allowed to be repeated; and
selecting the remediation instructions such that, when inserted into the set of program instructions, the number of times that instructions in the set of program instructions corresponding to the straight-line path will repeat when executed is limited.

6. A system, comprising:
memory to store instructions that, as a result of being executed by one or more processors of the system, cause the system to:
obtain one or more policies indicating a set of executable instructions, wherein the one or more policies indicate a time constraint for execution of the set of executable instructions;
evaluate the one or more policies and the set of executable instructions to determine a policy violation;
generate, based at least in part on the policy violation, remediated instructions; and
insert the remediated instructions into a routine of the set of executable instructions running in a virtual computing environment to modify the routine in response to the set of executable instructions violating the one or more policies while running in the virtual computing environment, wherein the remediated instructions cause the set of executable instructions to be in compliance with the one or more policies.

7. The system of claim 6, wherein:
portions of the set of executable instructions are annotated with annotations to distinguish a first part of a computer program from a remainder of the computer program; and
the system identifies the remediated instructions to comply with the annotations.

8. The system of claim 6, wherein the memory further includes instructions that, as a result of being executed by the one or more processors, cause the system to provide human-readable information indicating differences between the set of executable instructions and the remediated instructions.

9. The system of claim 6, wherein the instructions further include instructions that, as a result of being executed by the one or more processors cause the system to:
generate a set of straight-line paths from the set of executable instructions, wherein each straight-line path in the set of straight-line paths comprises non-branching segments of the set of executable instructions;
generate a set of execution flows from the set of executable instructions, wherein the set of execution flows indicates an order of execution of the set of straight-line paths; and
generate a set of path times corresponding to the set of straight-line paths.

10. The system of claim 9, wherein the set of execution flows, the set of straight-line paths, and the set of path times are determined not to comply with the one or more policies as a result of an evaluation indicating an execution time for the set of executable instructions is in excess of a time constraint.

11. The system of claim 6, wherein the remediated instructions are produced and inserted at a specific location into the set of executable instructions.

12. The system of claim 11, wherein the instructions that cause the system to produce the remediated instructions further comprise instructions that, as a result of being executed by the one or more processors, cause the system to:
generate the remediated instructions for terminating a loop after a determined number of iterations; and
insert the remediated instructions into the set of executable instructions.

13. The system of claim 11, wherein the instructions that cause the system to produce the remediated instructions further comprise instructions that, as a result of being executed by the one or more processors, cause the system to:
generate the remediated instructions for exiting from a recursive function after a determined nesting depth is attained; and
insert the remediated instructions into the set of executable instructions.

14. A non-transitory computer-readable storage medium comprising executable instructions that, as a result of being executed by one or more processors of a computer system, cause the computer system to:
obtain one or more policies indicating a set of executable instructions, wherein the one or more policies indicate a time constraint for execution of the set of executable instructions;
evaluate the one or more policies and the set of executable instructions to determine a policy violation;
generate, based at least in part on the policy violation, remediated instructions; and insert the remediated instructions into a routine of the set of executable instructions running in a virtual computing environment to modify the routine in response to the set of executable instructions violating the one or more policies while running in the virtual computing environment, wherein the remediated instructions cause the set of executable instructions to be in compliance with the one or more policies.

15. The non-transitory computer-readable storage medium of claim 14, wherein the one or more policies include time constraints that correspond to a service-level agreement.

16. The non-transitory computer-readable storage medium of claim 14, wherein a set of execution flows comprises a graph of vertices connected by edges, wherein each of the edges corresponds to a straight-line path of a set of straight-line paths.

17. The non-transitory computer-readable storage medium of claim 16, wherein the set of executable instructions further comprise instructions that, as a result of being executed by the one or more processors, cause the computer system to:

generate a set of path times corresponding to the set of straight-line paths, wherein each path time of the set of path times is generated by determining a number of instruction cycles sufficient to execute each instruction in a corresponding straight-line path of the set of straight-line paths; and evaluate whether the set of execution flows and the set of straight-line paths comply with the one or more policies includes evaluating whether, based at least in part on the set of path times, execution of the set of straight-line paths in an order of execution specified by the set of execution flows exceeds a limit of instruction cycles specified in the one or more policies.

18. The non-transitory computer-readable storage medium of claim 17, wherein each path time of the set of path times further comprises a confidence score indicating likelihood that a corresponding straight-line path will complete execution within each path time.

19. The non-transitory computer-readable storage medium of claim 18, wherein as a result of the confidence score being less than 100%, then the remediated instructions are produced by at least inserting a watchdog timer into the set of executable instructions.

20. The non-transitory computer-readable storage medium of claim 18, wherein the corresponding straight-line path corresponds to a first path time with a first confidence score and a second path time with a second confidence score.

* * * * *